(12) United States Patent  (10) Patent No.: US 6,208,487 B1
Furuki  (45) Date of Patent: Mar. 27, 2001

(54) FLOPPY DISC DRIVE CHUCKING DEVICE

(75) Inventor: Shigeru Furuki, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/388,179

(22) Filed: Sep. 1, 1999

(30) Foreign Application Priority Data

Sep. 3, 1998 (JP) ................................................. 10-250087

(51) Int. Cl.$^7$ .................................................... G11B 17/02
(52) U.S. Cl. ......................................................... 360/99.04
(58) Field of Search ............................... 360/99.04, 99.08

(56) References Cited

U.S. PATENT DOCUMENTS

| 4,825,314 | 4/1989 | Maekawa et al. . | |
| 4,873,595 | * 10/1989 | Taguchi et al. | 360/99.08 |
| 5,701,217 | * 12/1997 | Yokouchi | 360/99.08 |

* cited by examiner

Primary Examiner—Robert S. Tupper
(74) Attorney, Agent, or Firm—Brinks Hofer Gilson & Lione

(57) ABSTRACT

A floppy disc drive chucking device including a drive arm held as a result of being attracted upward. Both ends of the drive arm are suspended from a rotor yoke. A drive pin is formed on the front portion of the drive arm. It is loosely inserted into a hole formed in a center hub of a floppy disc. A sliding portion which comes into contact with the back portion defining an arm receiving hole is formed on the back portion of the drive arm. A guide path is formed at a location of the back portion defining the arm receiving hole coming into contact with the sliding portion. A side of the guide path gradually inclines backwards as it extends away from the rotational center of the rotor yoke. When a floppy disc is placed on the rotor yoke, and the rotor yoke is rotated, the entire drive arm moves outward, so that the drive pin comes into contact with a front edge and an outer edge defining the hole formed in the floppy disc center hub.

8 Claims, 3 Drawing Sheets

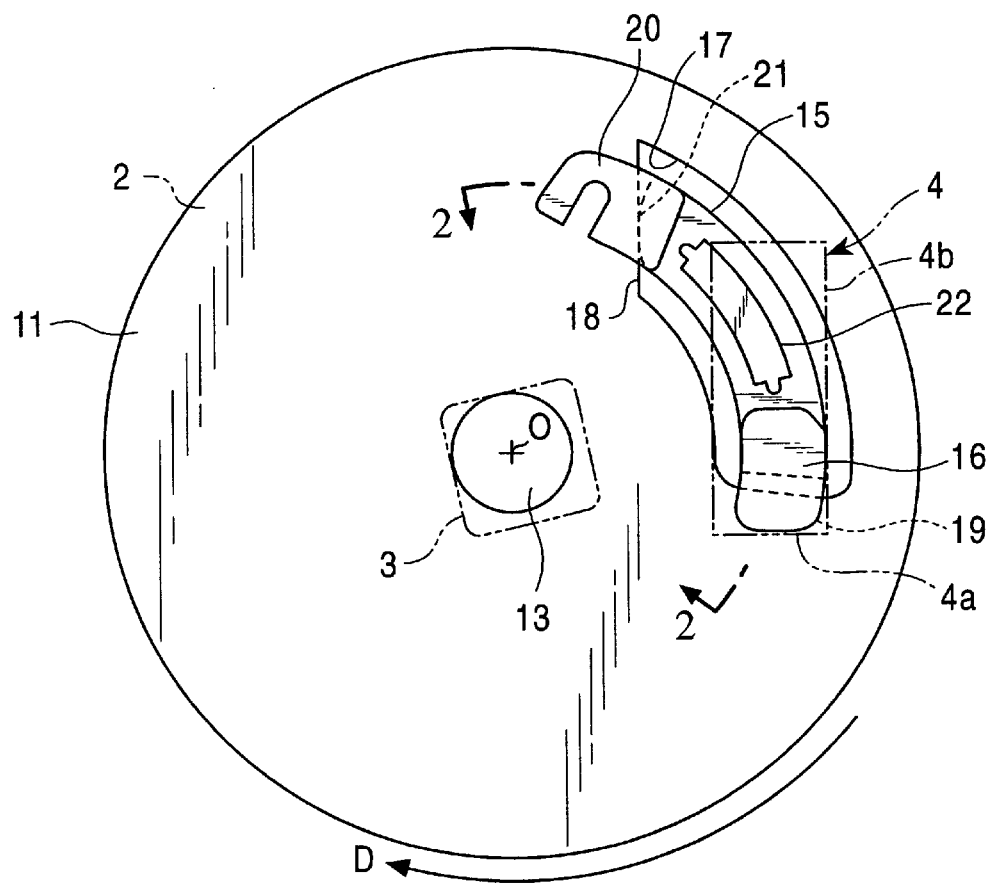
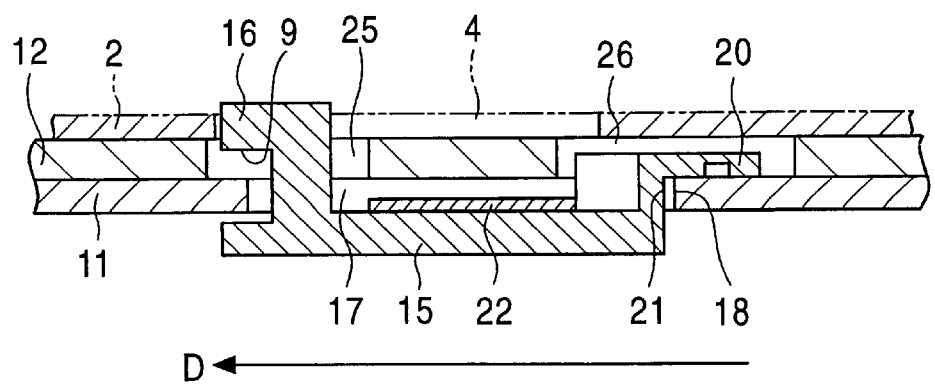

FLOPPY DISC DRIVE CHUCKING DEVICE

BACKGROUND OF THE INVENTION

1. Field of the Invention

The present invention relates to a floppy disc drive (FDD) chucking device which uses a reliable and low-cost means for centering a floppy disc for rotation when loading the floppy disc into the floppy disc drive.

2. Description of the Related Art

Record media (typified by floppy disks), that is, disc cartridges, are loaded into a floppy disc drive. A disc cartridge is a case containing a thin record disc. In a floppy disc drive, the record disc is rotated, and input operations of record data and output operations of recorded data are carried out through a write/read window (which opens to the case) provided with a shutter. A floppy disc drive must be capable of allowing easy removal of the record disc contained in the case from the floppy disc drive, precisely aligning the record disc with the axis of rotation of the floppy disc drive during write/read operations, and precisely controlling the rotational speed of the record disc. To achieve these, a chucking device, such as that shown in FIGS. 5 and 6, has been conventionally used in floppy disc drives.

A record disc, or a floppy disc, has a center hub at the center portion thereof. In FIGS. 5 and 6, the center hub 2 has a substantially square center hole 3 formed in the center portion thereof, and a substantially rectangular hole 4 formed in a peripheral edge portion thereof. The hole 4 is defined by a front edge 4a (being formed in correspondence with the front portion of a rotor yoke in the direction of rotation thereof) and an outer edge 4b (formed away from the center of rotation of the rotor yoke). In the specification, the direction away from the center of rotation of the rotor yoke is referred to as the outward direction.

A floppy disc drive includes a rotor yoke 101, which is a ferromagnetic metallic disc rotationally driven by a motor (not shown) in a certain direction (in the direction of arrow D in FIGS. 5 and 6). A magnetic disc (or a chucking magnet) 102 is affixed to the top portion of the rotor yoke 101.

A center shaft 103 is provided in a standing manner at the rotational center 0 of the rotor yoke 101. It passes through a hole 102a formed in the center portion of the magnetic disc 102. It is provided so as to be loosely inserted into the center hole 3 formed in the center hub 2.

In the specification, the term "loosely" will be used to describe a state in which the center shaft 103 can move freely horizontally and vertically within a predetermined range.

An arc-shaped drive pin through hole 104 is formed in a peripheral edge portion of the rotor yoke 101, along a circumference of the rotor yoke 101. An arc-shaped chucking arm 105 is loosely provided in the drive pin through hole 104. It is formed by molding, along a circumference of the through hole 104. An upwardly extending drive pin 106 is formed on an end portion (hereunder referred to as the "front portion") 105a of the chucking arm 105 oriented in the rotational direction D of the rotor yoke 101. The drive pin 106 loosely passes through a front portion opening 102b formed in the magnetic disc 102. It is provided so as to be loosely inserted into the hole 4 formed in the center hub 2. On the front portion 105a are formed flanges 105c and 105c, which support the front portion of the chucking arm 105 so that the chucking arm 105 can move horizontally and vertically within a predetermined range. When the front portion of the chucking arm 105 is movably supported, the portion of the rotor yoke 101 located adjacent the front portion of the drive pin through hole 104 is loosely disposed between the flanges 105c and 105c.

From a back end of the drive pin through hole 104 formed in the rotor yoke 101, the other end portion (hereinafter referred to as the "back portion") 105b of the chucking arm 105 extends towards the back, along the top surface of the rotor yoke 101 so as to form an L shape. In a back portion opening 102c formed in the magnetic disc 102, a sliding shaft 108 which protrudes from the top surface of the rotor yoke 101 is received by a receiving hole 105d, thereby allowing the back portion of the chucking arm 105 to slide horizontally within a range corresponding to the width of the drive pin through hole 104, with the sliding shaft 108 as center.

A ferromagnetic plate 109 is mounted to the top portion of the body of the chucking arm 105, and functions to magnetically attract the entire chucking arm 105, so that the drive pin 106 is pushed upward at all times.

When a floppy disc is loaded into the floppy disc drive, a record disc is placed on top of the rotor yoke 101. The center hub 2 of the record disc is magnetically attracted to the magnetic disc 102, and the center hole 3 formed in the center hub 2 receives the center shaft 103 disposed at the rotor yoke side. Here, the drive pin 106 which protrudes above the magnetic disc 102 does not have to be inserted into the hole 4 formed in the center hub 2. When the drive pin 106 is not inserted in the hole 4, it is pushed by the center hub 2 to the level of the lower surface of the center hub 2, against the force of attraction of the ferromagnetic plate 109.

Here, within the time the rotor yoke 101 rotates not more than once in the direction of arrow D as a result of starting a motor (not shown), the top portion of the drive pin 106 slidably rotates at the lower surface of the center hub 3, and moves upward into the hole 4 by the force of attraction of the ferromagnetic plate 109. When the drive pin 106 has moved upward into the hole 4, further rotation of the rotor yoke 101 in the direction of arrow D causes the chucking arm 105 to slide in the same direction that the drive pin 106 moves when the drive pin 106 moves away from the rotational center 0, by the centrifugal force produced by the rotation of the rotor yoke 101. This causes the drive pin 106 to come into contact with the outer edge 4b defining the hole 4. In addition, it slidably moves forward in the hole 4 by the rotational force of the rotor yoke 101 so as to come into contact with the front edge 4a defining the hole 4. Accordingly, the drive pin 106 comes into contact with and is supported by the front edge 4a and the outer edge 4b defining the hole 4.

At this time, the center shaft 103 comes into contact with and is supported by two adjacent sides 3a and 3b defining the center hole 3 of the center hub 2. The adjacent sides 3a and 3b oppose the drive pin 106, with the rotational center O being located between the two sides 3a and 3b. When the center of the record disc and the rotational center O of the center yoke 101 coincide when the center shaft 103 is supported by the two sides 3a and 3b, the chucking operation is completed. When the two centers coincide, the record disc, or the floppy disc, is not decentered, so that it can rotate precisely in accordance with the controlled rotational speed of the rotor yoke 101.

However, the above-described floppy disc drive chucking device has the following problems. When the above-described chucking arm 105 is used, it is necessary to form a sliding shaft 108 on the rotor yoke 101. Here, it is difficult to form sliding shaft 108 precisely to a required height. In addition, in order to mount the chucking arm 105 loosely, it is necessary to form a large drive pin through hole 104. Here, the rotor yoke 101 flexes when drive pin through hole 104 is being formed, resulting in increased surface movement of rotor yoke 101.

The method of supporting the drive pin 106 by the front edge and the outer edge defining the hole 4 formed in the center hub 2 relies only upon the rotational moment of the chucking arm 105. Here, sliding friction produced between the chucking arm 105 and the rotor yoke and sliding friction produced between the magnetic head and media prevent the center shaft 103 from coming into contact with the two adjacent sides 3a and 3b defining the center hub center hole 3. The record disc may start to rotate continuously even though the center shaft 103 is not in contact with the two sides 3a and 3b. This means that the record disc is not centered when it rotates continuously, resulting in read/write operation errors.

In addition, it is troublesome to incorporate the chucking arm 105, resulting in increased manufacturing costs.

SUMMARY OF THE INVENTION

To overcome the above-described problems, it is an object of the present invention to provide a floppy disc drive chucking device which can support a drive pin by a front edge and an outer edge defining a hole by a reliable and low cost means, so that the record disc is centered for rotation, in order to achieve precise write/readout operations at all times.

To this end, according to one aspect of the present invention, there is provided a floppy disc drive chucking device comprising:

a rotor yoke which rotates in a certain direction;

a center shaft, provided in a standing manner at the center of rotation of the rotor yoke, for being loosely inserted into a center hole formed in a center hub;

a drive arm provided at a lower side of the rotor yoke so as to extend along a circumference thereof, both ends of the drive arm being loosely suspended from the rotor yoke, the drive arm being held as a result of being attracted upward;

a drive pin formed on a front portion of the drive arm in a direction of rotation of the rotor yoke, the drive pin loosely passing through an arm receiving hole so as to extend upward, the arm receiving hole being formed in the rotor yoke, the drive pin being provided for being loosely inserted into a hole formed in a peripheral edge of the center hub and defined by a front edge and an outer edge, the front edge being formed in correspondence with a front portion of the rotor yoke in the direction of rotation of the rotor yoke, and the outer edge being formed away from the center of rotation of the rotor yoke;

a sliding portion formed on a back portion of the drive arm in the direction of rotation of the rotor yoke, the sliding portion being formed so as to come into contact with a back portion defining the arm receiving hole; and a guide path formed at a location where a side of the guide path comes into contact with the sliding portion disposed at the back portion of the arm receiving hole, the side of the guide path gradually inclining backwards as the side of the guide path extends away from the center of rotation of the rotor yoke;

wherein when the rotor yoke with a floppy disc placed thereon is rotated, the entire drive arm moves away from the center of rotation of the rotor yoke, so that the drive pin is pushed towards the front edge and the outer edge defining the hole formed in the center hub.

In such a case, the drive pin is reliably inserted into the center hub hole within the time the rotor yoke rotates not more than once. This is because the drive pin is formed on the drive arm held as a result of being attracted upward. In addition, a floppy disc can be reliably chucked when the drive pin is supported by a front edge and an outer edge. The supporting of the drive pin is achieved in the following way. When the rotor yoke rotates in a certain direction, the drive pin of the drive arm comes into contact with the front edge defining the center hub hole, and the sliding portion formed on the back portion of the drive arm slides outward in the guide path formed in the back portion of the arm receiving hole formed in the rotor yoke. When the entire drive arm moves outward, the drive pin is pushed against the outer edge of the hole formed in the center hub. Further, the drive pin can reliably be brought into contact with the outer edge, so that the floppy disc is centered for rotation. This is because the drive arm is loosely suspended from the rotor yoke, making it unnecessary to use a sliding shaft. When a sliding shaft is not used, the problem of sliding resistance does not exist.

The drive arm may be suspended from and held by the rotor yoke through a front flange and a back flange, the front flange being formed on a front side surface of the drive pin and loosely engaging a portion of a top surface of the rotor yoke located adjacent a front portion of the arm receiving hole, and the back flange being formed on the back portion of the drive arm and being placed on a portion of the top surface of the rotor yoke located adjacent the back portion of the arm receiving hole.

In such a case, the drive pin can move vertically because the front flange loosely engages the top surface of the rotor yoke. In addition, when the drive pin is not inserted in the hole formed in the center hub, it can dip to the level of the lower surface of the center hub. Further, it is possible to eliminate the problem of the drive arm getting dislodged from the rotor yoke due to vibration or the like because the drive arm is retained by the front flange and the back flange. Still further, sliding resistance can be minimized when supporting the drive pin by the front edge and the outer edge because the drive arm is made to float as a result of being attracted upward during rotation of the rotor yoke.

When the floppy disc drive chucking device of one aspect of the present invention is used, a magnetic disc may be placed on top of the rotor yoke to magnetically attract the center hub of the floppy disc, the magnetic disc having a cutout hole formed therein so as not to prevent movement of the drive arm, and at least the top surface of the body of the drive arm may be formed of a ferromagnetic material, which is attracted to the magnetic disc to hold the drive arm by attracting the drive arm upward.

In such a case, magnetic discs conventionally used in floppy disc drives can be used to attract and hold the drive arm, making it unnecessary to use additional means to attract and hold the drive arm.

When the floppy disc drive chucking device of one aspect of the present invention is used, a spring may be mounted to the rotor yoke to push the drive pin away from the center of rotation of the rotor yoke.

In such a case, in addition to being moved outward when the sliding surface of the drive arm and a side of the guide path come into contact with each other, the drive pin is also pushed against the outer edge defining the center hub hole by the spring. Therefore, even when the drive pin cannot be reliably brought into contact with the outer edge only by the movement of the drive arm, it is possible to prevent decentering of a floppy disc and axial movement of the drive pin, so that more stable chucking operations can be achieved.

According to another aspect of the present invention, there is provided a floppy disc drive chucking device comprising:

a rotor yoke which rotates in a certain direction;

a center shaft, provided in a standing manner at the center of rotation of the rotor yoke, for being loosely inserted into a center hole formed in a center hub of a floppy disc;

a magnetic disc, placed on and affixed to the rotor yoke, for magnetically attracting the center hub of the floppy disc;

a drive arm provided at a lower side of the rotor yoke so as to extend along a circumference thereof, both ends of the drive arm being loosely suspended from the rotor yoke or the magnetic disc, the drive arm being held as a result of being attracted upward;

a drive pin formed on a front portion of the drive arm in a direction of rotation of the rotor yoke, the drive pin loosely passing through an arm receiving hole so as to extend upward, the arm receiving hole being formed in the rotor yoke or the magnetic disc, or in the rotor yoke and the magnetic disc, the drive pin being provided for being loosely inserted into a hole formed in a peripheral edge of the center hub and defined by a front edge and an outer edge, the front edge being formed in correspondence with a front portion of the rotor yoke in the direction of rotation of the rotor yoke, and the outer edge being formed away from the center of rotation of the rotor yoke;

a sliding portion formed on a back portion of the drive arm in the direction of rotation of the rotor yoke, the sliding portion being formed so as to come into contact with a back portion defining the arm receiving hole; and a guide path formed at a location where a side of the guide path comes into contact with the sliding portion disposed at the back portion of the arm receiving hole, the side of the guide path gradually inclining backwards as the side of the guide path extends away from the center of rotation of the rotor yoke;

wherein when the rotor yoke with the floppy disc placed thereon is rotated, the entire drive arm moves away from the center of rotation of the rotor yoke, so that the drive pin is pushed towards the front edge and the outer edge defining the hole formed in the center hub.

In such a case, the drive pin is reliably inserted into the center hub hole within the time the rotor yoke rotates not more than once. This is because the drive pin is formed on the drive arm held as a result of being attracted upward. In addition, a floppy disc can be reliably chucked when the drive pin is supported by a front edge and an outer edge. The supporting of the drive pin is achieved in the following way. When the rotor yoke rotates in a certain direction, the drive pin of the drive arm comes into contact with the front edge defining the center hub hole, and the sliding portion formed on the back portion of the drive arm slides outward in the guide path formed in the back portion of the arm receiving hole formed in the rotor yoke. When the entire drive arm moves outward, the drive pin is pushed against the outer edge of the hole formed in the center hub. Further, the drive pin can reliably be brought into contact with the outer edge, so that the floppy disc is centered for rotation. This is because the drive arm is loosely suspended from the rotor yoke or the magnetic disc, making it unnecessary to use a sliding shaft. When a sliding shaft is not used, the problem of sliding resistance does not exist.

The drive arm may be suspended from and held by the rotor yoke through a front flange and a back flange, the front flange being formed on a front side surface of the drive pin and loosely engaging a portion of a top surface of the rotor yoke or the magnetic disc located adjacent a front portion of the arm receiving hole, and the back flange being formed on the back portion of the drive arm and being placed on a portion of the top surface of the rotor yoke or the magnetic disc located adjacent the back portion of the arm receiving hole.

In such a case, the drive pin can move vertically because the front flange loosely engages the top surface of the rotor yoke or the magnetic disc. In addition, when the drive pin is not inserted in the hole formed in the center hub, it can dip to the level of the lower surface of the center hub. Further, it is possible to eliminate the problem of the drive arm getting dislodged from the rotor yoke due to vibration or the like because the drive arm is retained by the front flange and the back flange. Still further, sliding resistance can be minimized when supporting the drive pin by the front edge and the outer edge because the drive arm is made to float as a result of being attracted upward during rotation of the rotor yoke.

When the floppy disc drive chucking device of another aspect of the present invention is used, at least the top surface of the body of the drive arm may be formed of a ferromagnetic material, which is attracted to the magnetic disc to hold the drive arm by attracting the drive arm upward.

In such a case, magnetic discs conventionally used in floppy disc drives can be used to attract and hold the drive arm, making it unnecessary to use additional means to attract and hold the drive arm.

When the floppy disc drive chucking device of another aspect of the present invention is used, a spring may be mounted to the rotor yoke to push the drive pin away from the center of rotation of the rotor yoke.

In such a case, in addition to being moved outward when the sliding surface of the drive arm and a side of the guide path come into contact, the drive pin is also pushed against the outer edge defining the center hub hole by the spring. Therefore, even when the drive pin cannot be reliably brought into contact with the outer edge just by the movement of the drive arm, it is possible to prevent decentering of a floppy disc and axial movement of the drive pin, so that more stable chucking operations can be achieved.

BRIEF DESCRIPTION OF THE DRAWINGS

FIG. 1 is a plan view of an embodiment of the present invention.

FIG. 2 is a sectional view taken along arcuate line 2—2 of FIG. 1.

DESCRIPTION OF THE PREFERRED EMBODIMENTS

A description will now be given of embodiments of the chucking device in accordance with the present invention.

Figure 5:
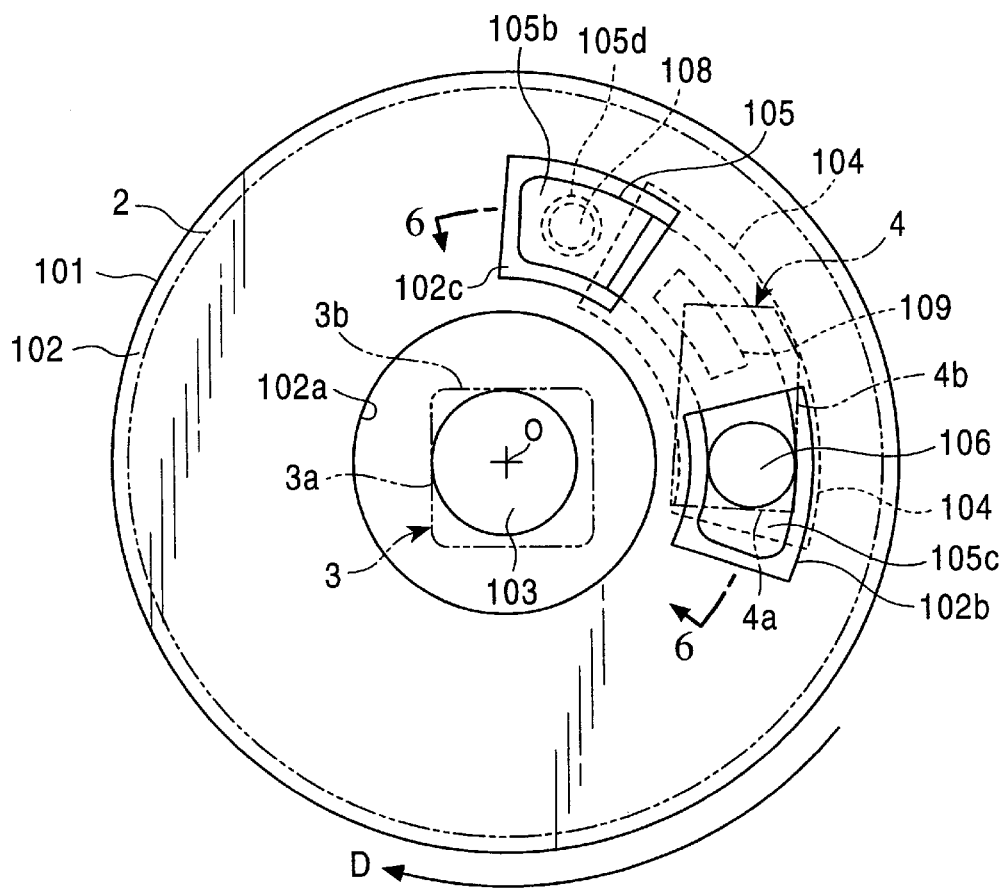
FIG. 5 is a plan view of a conventional chucking device.
Figure 6:
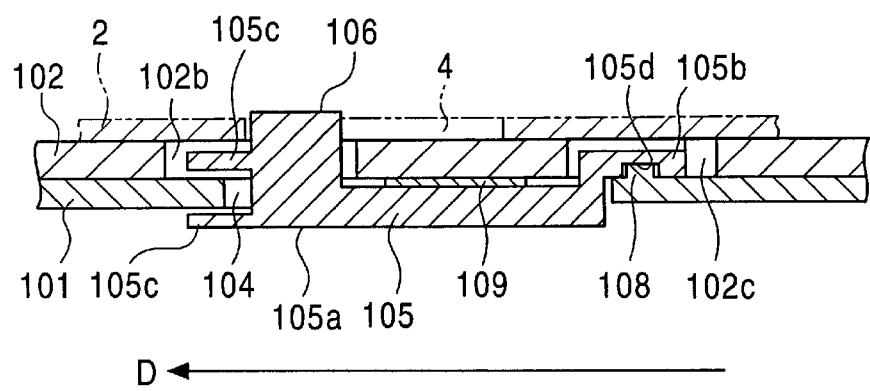
FIG. 6 is a sectional view taken along arcuate line 6—6 of FIG. 5.

FIGS. 1 and 2 both illustrate a portion of a floppy disc drive (FDD) provided with a floppy disc drive chucking device in accordance with the present invention. For convenience, the magnetic disc 12 shown in FIG. 2 is not shown in FIG. 1. Component parts illustrated in FIGS. 1 and 2 which correspond to those illustrated in FIGS. 5 and 6 are given the same reference numerals. Descriptions of the corresponding component parts have been either simplified or omitted.

In FIGS. 1 and 2, the floppy disc drive comprises a rotor yoke 11 which is a ferromagnetic metallic disc rotationally driven in the direction of arrow D by a motor (not shown). A magnetic disc (chucking magnet) 12 is affixed to the top portion of the rotor yoke 11. A center shaft 13 is provided in a standing manner at the rotational center O of the rotor yoke 11. The center shaft 13 is inserted into a hole (not shown) formed in the center portion of the magnetic disc 12. When a floppy disc is placed on the rotor yoke 11, the center shaft 13 is loosely inserted in a center hole 3 formed in a center hub 2.

Figure 3:
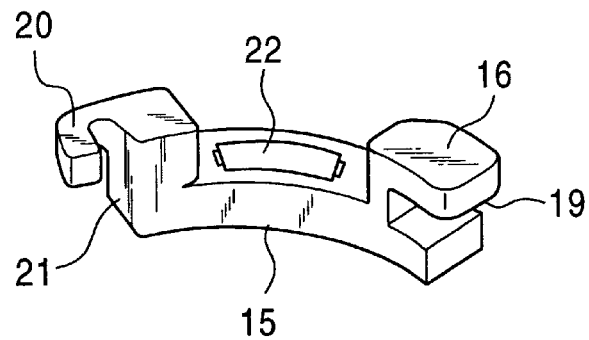
FIG. 3 is a perspective view of a drive arm, used in the embodiment of the present invention.

An arcuate arm receiving hole 17 is formed in a peripheral edge portion of the rotor yoke 11, along a circumference of the rotor yoke 11. From the front portion to the back portion of the arm receiving hole 17, an arcuate drive arm 15 (shown in FIG. 3) extends at the lower side of the rotor yoke 11, along the circumference of the rotor yoke 11. Both ends of the drive arm 15 are loosely suspended from the rotor yoke 11. As described later, the drive arm 15 is suspended through a front flange 19 and a back flange 20. The front flange 19 is formed on a front side surface of the drive pin 16, while the back flange 20 is formed on the back portion of the drive arm 15. A ferromagnetic plate 22 is mounted to the top surface of the body of the drive arm 15, which is held as a result of being attracted upward when the ferromagnetic plate 22 is magnetically attracted to a magnetic disc 12 disposed thereabove.

The drive pin 16 is formed on the front portion of the drive arm 15. It loosely passes through the arm receiving hole 17 so as to extend upward. It can be loosely inserted into a hole formed in a peripheral edge portion of the center hub 2. The hole 4 formed in the center hub 2 is defined by a front edge 4a and an outer edge 4b.

A sliding portion 21 is formed on the back portion of the drive arm 15 so as to come into contact with the back portion defining the arm receiving hole 17. A guide path 18 is formed at the back portion of the arm receiving hole 17 formed in the rotor yoke 11, at a location where a side of the guide path 18 is formed so as to come into contact with the sliding portion 21. A side of the guide path 18 gradually inclines backwards (or in a direction opposite to the rotational direction D) as it extends away from the rotational center O of the rotor yoke 11.

Figure 4:
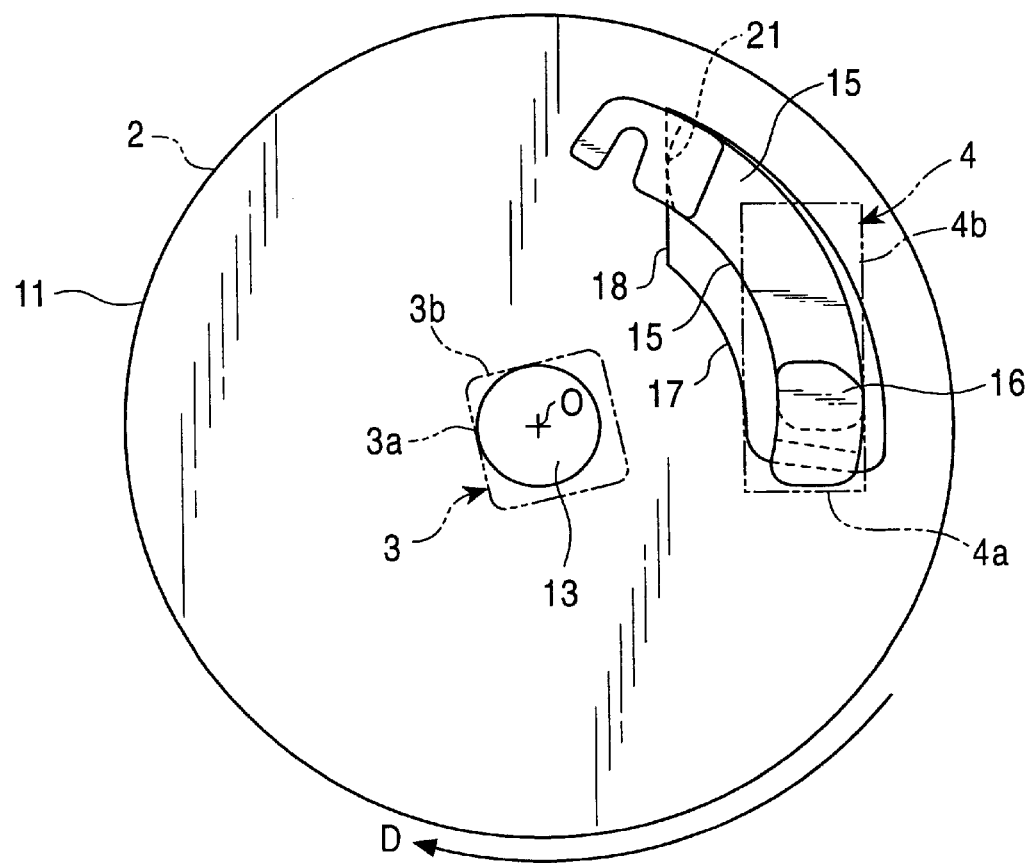
FIG. 4 is a perspective plan view of a chucking mechanism, used in the embodiment of the present invention.

As shown in FIG. 4, when the rotor yoke 11 having a floppy disc placed thereon rotates in the direction of arrow D, the drive pin 16 is inserted into the center hub hole 4. In reaction to this, the drive arm 15 is pushed backward, so that the sliding portion 21 comes into contact with a side of the guide path 18 formed at the back portion of the arm receiving hole 17. The entire drive arm 15 slides outward along the guide path 18, so that the drive pin 16 comes into contact with the outer edge 4b defining the hole 4. At the same time, the drive pin 16 also comes into contact with the front edge 4a defining the hole 4 formed in the center hub 2 which has shifted backward along the top surface of the magnetic disc 12 due to the rotation of the rotor yoke 11. In this way, the drive pin 16 is supported by the front edge 4a and the outer edge 4b, thereby allowing reliable floppy disc chucking operations to be achieved.

In the above-described structure, the drive arm 15 is simply loosely suspended from the rotor yoke 11, so that a sliding shaft is not required. In such a case, sliding resistance is not produced. Therefore, it is possible to reliably bring the drive pin 16 into contact with the outer edge 4b, thus preventing decentering of a floppy disc when it is rotated.

The guide path 18 may be formed in the magnetic disc 12 instead of in the rotor yoke 11. In that case, the drive arm 15 is loosely suspended from the magnetic disc 12 through the front flange 19 and the back flange 20, and the sliding portion 21 comes into contact with a side of the guide path 18 formed in the magnetic disc 12.

The drive arm 15 has front flange 19, which is formed on a front side surface of the drive pin 16. It loosely engages a portion of the top surface of the rotor yoke 11 located adjacent the front portion of the arm receiving hole 17. The drive arm 15 has back flange 20, which is loosely inserted into the arm receiving hole 17. It extends above a portion of the top surface of the rotor yoke 11 located adjacent the back portion of the arm receiving hole 17. It is formed so as to be placed on the top surface of the rotor yoke 11. The drive arm 15 is loosely suspended from the rotor yoke 11 through the front flange 19 and the back flange 20.

The drive pin 16 can move vertically because the front flange 19 loosely engages the top surface of the rotor yoke 11. In addition, when the drive pin 16 is not inserted in the hole 4 formed in the center hub 2, it can dip to the level of the lower surface of the center hub 2. Further, it is possible to eliminate the problem of the drive arm 15 getting dislodged from the rotor yoke 11 due to vibration or the like because the drive arm 15 is retained by the front flange 19 and the back flange 20. Still further, sliding resistance can be minimized when supporting the drive pin 16 by the front edge and the outer edge because the drive arm 15 is made to float as a result of being attracted upward during rotation of the rotor yoke 11.

As shown in FIG. 2, in the floppy disc drive of the embodiment, the magnetic disc 12 which magnetically attracts the center hub 2 of a floppy disc is placed on the top surface of the rotor yoke 11. The magnetic disc 12 has a hole (not shown), a cutout hole 25, and a cutout hole 26. The hole which is not shown is formed in the center portion of the magnetic disc 12 for receiving a center shaft 13. The center shaft 13 is inserted into the hole so as not to come into contact with the side of the hole. The cutout hole 25 is formed along a circumference of the magnetic disc 12 and with a shape which does not prevent movement of the drive pin 16. The cutout hole 26 is also formed along the circumference of the magnetic disc 12 so as to accommodate the back flange 20 loosely. The magnetic disc 12 is affixed to the top surface of the rotor yoke 11.

Although not shown, a cutout hole is formed in the magnetic disc 12 so as to be disposed opposite the cutout holes 25 and 26 for keeping the rotor yoke 11 balanced during rotation thereof. Here, the rotational center is located between the cutout holes 25 and 26.

When a floppy disc is loaded into the above-described floppy disc drive, it is placed on top of the rotor yoke 11, and the center shaft 13 inserted in the rotor yoke 11 is received by the center hub 2 of the record disc. Here, the drive pin 16 which protrudes above the magnetic disc 12 does not have to be inserted into the hole 4 formed in the center hub 2. When it is not inserted in the hole 4, the drive pin 16 is pushed by the center hub 2 from thereabove to the level of the lower surface of the center hub 2, against the attraction force between the magnetic disc 12 and the ferromagnetic plate 22. Since the front portion of the drive arm 15 is loosely suspended through the front flange 19, the drive pin 16 can be dipped to the level of the lower surface of the center hub 2.

Within the time the rotor yoke 11 rotates not more than once in the direction of arrow D as a result of starting a motor (not shown), the top portion of the drive pin 16 attracted upward slidably rotates at the lower surface of the center hub 2 and reaches the hole 4. Then, it moves upward due to the attraction force between the magnetic disc 12 and the ferromagnetic plate 22, whereby it is inserted into the hole 4. With the drive pin 16 being inserted in the hole 4, when the rotor yoke 11 rotates further in the direction of arrow D, the drive pin 16 slidably moves forward in the hole 4 and comes into contact with the front edge 4a defining the hole 4.

When the rotor yoke 11 accelerates, the drive arm 15 is shifted backwards relative to the rotor yoke 11, so that the sliding portion 21 of the drive arm 15 comes into contact with a side of the guide path 18 formed in the arm receiving hole 17. When the sliding portion 21 comes into contact with the side of the guide path 18, the back portion of the drive arm 15 is pushed outward. The front portion of the drive arm 15 moves outward due to the action of centrifugal force produced by the rotation of the rotor yoke 11, and comes into contact with the outer edge 4b defining the hole 4 and stops there. This causes the drive pin 16 to be supported by the front edge 4a and the outer edge 4b defining the hole 4, as shown in FIG. 4.

With the drive pin 16 being supported as described above, the center shaft 13 (disposed in the rotor yoke 11) is disposed in the floppy disc so as to be supported by two adjacent sides 3a and 3b. The sides 3a and 3b oppose the drive pin 16, with the rotational center O being located between the sides 3a and 3b. The center of the record disc and the rotational center O of the rotor yoke 11 coincide, and the chucking operation is completed. When the chucking operation is completed, the record disc, or the floppy disc, is not decentered, so that it can rotate precisely in accordance with the controlled rotational speed of the rotor yoke 11.

In another embodiment of the present invention, a pusher spring may be provided at the lower surface of the rotor yoke 11 to push the drive pin 16 outward. In this case, even when contact between the drive pin 16 and the outer edge 4b is affected by vibration or the like, the drive pin 16 is also pushed towards the outer edge 4b defining the hole 4 by the pusher spring. This prevents decentering of the floppy disc and axial movement of the drive pin 16, making it possible to achieve more stable chucking operations.

In the chucking devices of the embodiments, the drive arm 15 does not have a sliding structure. Therefore, compared to the conventional chucking device shown in FIGS. 5 and 6, they have a simpler structure and can be assembled more easily. The chucking devices of the above-described embodiments allow a drive arm to be supported by a front edge and an outer edge more reliably and at a low cost, thereby preventing decentering of the record disc.

What is claimed is:

1. A floppy disc drive chucking device, comprising:
   a rotor yoke which rotates in a certain direction;
   a center shaft, provided in a standing manner at the center of rotation of the rotor yoke, for being loosely inserted into a center hole formed in a center hub;
   a drive arm provided at a lower side of the rotor yoke so as to extend along a circumference thereof, both ends of the drive arm being loosely suspended from the rotor yoke, the drive arm being held as a result of being attracted upward;
   a drive pin formed on a front portion of the drive arm in a direction of rotation of the rotor yoke, the drive pin loosely passing through an arm receiving hole so as to extend upward, the arm receiving hole being formed in the rotor yoke, the drive pin being provided for being loosely inserted into a hole formed in a peripheral edge of the center hub and defined by a front edge and an outer edge, the front edge being formed in correspondence with a front portion of the rotor yoke in the direction of rotation of the rotor yoke, and the outer edge being formed away from the center of rotation of the rotor yoke;
   a sliding portion formed on a back portion of the drive arm in the direction of rotation of the rotor yoke, the sliding portion being formed so as to come into contact with a back portion defining the arm receiving hole; and
   a guide path formed at a location where a side of the guide path comes into contact with the sliding portion disposed at the back portion of the arm receiving hole, the side of the guide path gradually inclining backwards as the side of the guide path extends away from the center of rotation of the rotor yoke;
   wherein when the rotor yoke with a floppy disc placed thereon is rotated, the entire drive arm moves away from the center of rotation of the rotor yoke, so that the drive pin is pushed towards the front edge and the outer edge defining the hole formed in the center hub.

2. A floppy disc drive chucking device according to claim 1, wherein the drive arm is suspended from and held by the rotor yoke through a front flange and a back flange, the front flange being formed on a front side surface of the drive pin and loosely engaging a portion of a top surface of the rotor yoke located adjacent a front portion of the arm receiving hole, and the back flange being formed on the back portion of the drive arm and being placed on a portion of the top surface of the rotor yoke located adjacent the back portion of the arm receiving hole.

3. A floppy disc drive chucking device according to claim 1, wherein a magnetic disc is placed on top of the rotor yoke to magnetically attract the center hub of the floppy disc, the magnetic disc having a cutout hole formed therein so as not to prevent movement of the drive arm, and wherein at least the top surface of the body of the drive arm is formed of a ferromagnetic material, which is attracted to the magnetic disc to hold the drive arm by attracting the drive arm upward.

4. A floppy disc drive chucking device according to claim 1, wherein a spring is mounted to the rotor yoke to push the drive pin away from the center of rotation of the rotor yoke.

5. A floppy disc drive chucking device, comprising:
   a rotor yoke which rotates in a certain direction;
   a center shaft, provided in a standing manner at the center of rotation of the rotor yoke, for being loosely inserted into a center hole formed in a center hub of a floppy disc;

a magnetic disc, placed on and affixed to the rotor yoke, for magnetically attracting the center hub of the floppy disc;

a drive arm provided at a lower side of the rotor yoke so as to extend along a circumference thereof, both ends of the drive arm being loosely suspended from the rotor yoke or the magnetic disc, the drive arm being held as a result of being attracted upward;

a drive pin formed on a front portion of the drive arm in a direction of rotation of the rotor yoke, the drive pin loosely passing through an arm receiving hole so as to extend upward, the arm receiving hole being formed in the rotor yoke or the magnetic disc, or in the rotor yoke and the magnetic disc, the drive pin being provided for being loosely inserted into a hole formed in a peripheral edge of the center hub and defined by a front edge and an outer edge, the front edge being formed in correspondence with a front portion of the rotor yoke in the direction of rotation of the rotor yoke, and the outer edge being formed away from the center of rotation of the rotor yoke;

a sliding portion formed on a back portion of the drive arm in the direction of rotation of the rotor yoke, the sliding portion being formed so as to come into contact with a back portion defining the arm receiving hole; and a guide path formed at a location where a side of the guide path comes into contact with the sliding portion disposed at the back portion of the arm receiving hole, the side of the guide path gradually inclining backwards as the side of the guide path extends away from the center of rotation of the rotor yoke;

wherein when the rotor yoke with the floppy disc placed thereon is rotated, the entire drive arm moves away from the center of rotation of the rotor yoke, so that the drive pin is pushed towards the front edge and the outer edge defining the hole formed in the center hub.

6. A floppy disc drive chucking device according to claim 5, wherein the drive arm is suspended from and held by the rotor yoke through a front flange and a back flange, the front flange being formed on a front side surface of the drive pin and loosely engaging a portion of a top surface of the rotor yoke or the magnetic disc located adjacent a front portion of the arm receiving hole, and the back flange being formed on the back portion of the drive arm and being placed on a portion of the top surface of the rotor yoke or the magnetic disc located adjacent the back portion of the arm receiving hole.

7. A floppy disc drive chucking device according to claim 5, wherein at least the top surface of the body of the drive arm is formed of a ferromagnetic material, which is attracted to the magnetic disc to hold the drive arm by attracting the drive arm upward.

8. A floppy disc drive chucking device according to claim 5, wherein a spring is mounted to the rotor yoke to push the drive pin away from the center of rotation of the rotor yoke.

* * * * *